US012665667B2

(12) United States Patent (10) Patent No.: US 12,665,667 B2
Feo Arenis et al. (45) Date of Patent: Jun. 23, 2026

(54) METHOD FOR ESTABLISHING FREE-SPACE DATA TRANSMISSION CHANNELS

(71) Applicant: Airbus (S.A.S.), Blagnac Cedex (FR)

(72) Inventors: Sergio Feo Arenis, Taufkirchen (DE); Philipp Helle, Taufkirchen (DE); Kevin Shortt, Taufkirchen (DE); Carsten Strobel, Taufkirchen (DE)

(73) Assignee: Airbus (S.A.S.), Blagnac (FR)

( * ) Notice: Subject to any disclaimer, the term of this patent is extended or adjusted under 35 U.S.C. 154(b) by 275 days.

(21) Appl. No.: 18/658,060

(22) Filed: May 8, 2024

(65) Prior Publication Data

US 2024/0380485 A1 Nov. 14, 2024

(30) Foreign Application Priority Data

May 8, 2023 (EP) ..................................... 23171971

(51) Int. Cl.
*H04B 10/11* (2013.01)
(52) U.S. Cl.
CPC ..................................... *H04B 10/11* (2013.01)
(58) Field of Classification Search
CPC ..................................................... H04B 10/11
See application file for complete search history.

(56) References Cited

U.S. PATENT DOCUMENTS

2010/0142447 A1* 6/2010 Schlicht ................... H04W 4/20
370/328
2019/0173569 A1* 6/2019 Liu ........................ H04B 7/1851
2022/0173806 A1* 6/2022 Shortt ................ H04B 7/18513

FOREIGN PATENT DOCUMENTS

DE 102020131966 A1 6/2022
EP 3014792 B1 5/2020

OTHER PUBLICATIONS

Cardei, Ionut et al, "Communications Quality of Service for Ad-hocMobile Optical Free-Space Networks," 3rd IEEE Consumer Communications and Networking Conference, 2006, pp. 142-146.
European Search Report for Application No. 231719717 dated Oct. 31, 2023.

* cited by examiner

*Primary Examiner* — Shi K Li

(74) *Attorney, Agent, or Firm* — KDW Firm PLLC

(57) ABSTRACT

A method for establishing free-space data transmission channels between a movable network node and a spatially fixed network node includes collecting dynamic position information regarding movable network nodes and static position information relating to spatially fixed nodes, calculating parameters for the nodes from position information, creating a service level agreements list indicating transmission links to be set up between two or more of the nodes with predetermined service performance parameters, creating a prioritization list of the agreements based on the list, checking which of a selection of nodes are available for a directional free-space data transmission channel between the two or more of the nodes with the predetermined service performance parameters defined by the agreement having the highest priority in the prioritization list, and setting up a directional free-space data transmission channel between the two or more of the nodes using the selection.

6 Claims, 1 Drawing Sheet

METHOD FOR ESTABLISHING FREE-SPACE DATA TRANSMISSION CHANNELS

TECHNICAL FIELD

The disclosure herein relates to a method for establishing free-space data transmission channels, in particular in connection with setting up and maintaining directional communication networks in air-to-ground mobile communication abiding to preconfigurable quality-of-service (QOS) parameters.

BACKGROUND

Conventional air-to-ground mobile communication is based on communication channels which are based on non-directional, that is to say omnidirectional, radio-frequency communication (RF). The practices of setting up and maintaining networks for air-to-ground mobile communication are likewise based on techniques which are used for omnidirectional RF communication.

The inclusion of free-space optical communication (FSOC), also called free-space optical data transmission, in air-to-ground networks makes it possible to expand ground-based backbone fibre networks to aircraft and spacecraft. The integration of FSOC technologies in the European Aviation Network (EAN) enables unprecedented connectivity for all those involved in the entire aviation industry. Operating processes developed for FSOC applications may likewise be applied to satellite communication for GEO and LEO architectures.

Closely networked RF communication networks are also referred to as mesh networks. The connectivity between individual network nodes in a mesh network is very high, and so the reliability and availability of the mesh network are particularly high. The higher frequency of the carrier waves in comparison with RF communication enable mesh networks which are based on FSOC to maintain considerably higher data rates and a lower susceptibility to interference caused by multi-path propagation and echoes. In addition, many frequency bands are available in the optical frequency range.

Optical communication networks in the form of mesh networks are generally composed of a set of direct point-to-point connections. In order to increase the resilience of the mesh network, it is desirable to stabilize the setup of the individual FSOC network connections and to thereby improve the availability of the mesh network. Such optical communication networks which connect movable network nodes to one another have a deterministic nature, on the one hand, on account of the direct, directional point-to-point connections. However, on the other hand, it is necessary to determine the exact position of the movable network nodes in order to be able to actually establish directional point-to-point connections in a useful manner.

The data throughput of the data communicated via directional point-to-point connections is considerably higher in optical communication networks than in the case of omnidirectional RF connections, with the result that even minor temporary interruptions in the point-to-point connections would result in very high potential data losses. The document DE 10 2020 131 966 A1, for example, discloses a method for reliably establishing free-space data transmission channels avoiding such problems.

One of the remaining challenges is to ensure specific network level goals, for example as defined in external service level agreements.

The document EP 3 014 792 B1 discloses a method for implementing an adaptive free-space optical network having a dynamic mesh topology with high connectivity. The document CARDEI, Ionut; PAVAN, Allalaghatta; BETTATI, Riccardo: "Communications quality of service for ad-hoc mobile optical free-space networks", in: 3rd IEEE Consumer Communications and Networking Conference, 2006, pp. 142-146 discloses a mechanism for deploying dependable TCP services in a quality of service enabled ad-hoc mobile optical free-space network.

SUMMARY

One of the objects of the disclosure herein therefore involves finding solutions for the maintenance of predefined network capabilities and fulfilment of predefined performance requirements in ad-hoc and dynamically established directional communication connections in high-bandwidth networks.

This and other objects are achieved by a method disclosed herein.

According to a first aspect of the disclosure herein, a method for establishing free-space data transmission channels between a movable network node and a spatially fixed network node comprises the steps of collecting dynamic position information relating to a multiplicity of movable network nodes and static position information relating to a multiplicity of spatially fixed network nodes, calculating specific and node-dependent parameters for each of the movable or spatially fixed network nodes, which are relevant to setting up and maintaining directional point-to-point connections, on the basis of the collected dynamic and static position information, creating a service level specifications list of a plurality of service level agreements indicating transmission links to be set up between two or more of the movable or spatially fixed network nodes with predetermined service performance parameters, creating a prioritization list of the plurality of service level agreements on the basis of the service level specifications list, checking which of a selection of movable or spatially fixed network nodes are available for setting up a directional free-space data transmission channel between the two or more of the movable or spatially fixed network nodes with the predetermined service performance parameters defined by the service level agreement having the highest priority in the created prioritization list, and setting up a directional free-space data transmission channel between the two or more of the movable or spatially fixed network nodes using the selection of movable or spatially fixed network nodes.

An important idea of the disclosure herein involves the ability of a network management to configure an ad-hoc network topology of directional, in particular optical, communication connections in high-bandwidth networks composed of a heterogeneous mixture of stationary and mobile network nodes, for instance ships, trains, cars, aircraft, spacecraft or satellites. This ability enables the network to achieve specific network level goals as defined in service level agreements. Such service level agreements may advantageously be implemented in cohesive communication networks which can be used as an expansion of existing stationary photonic networks.

One of the advantages of the method according to the disclosure herein is that the reliability, redundancy and failure safety of directional free-space data transmission communication networks can be increased, which can give rise to excellent improvements, in particular in the case of data transmissions with a very high bandwidth in dynamic network environments. Moreover, the network nodes employing the enhanced network management algorithm may advantageously be able to self-organize in such a way that network paths between specific pairs of points within the network are provided for. Each of such pairs may be assigned to a specific level of service as defined in flexibly configurable service level agreements.

The network management algorithm may advantageously be oriented towards fulfilment of specific service level agreements rather than the inefficient build-up of a network per se without specific network goals. By purposeful orientation towards prioritized services the maintenance, restructuring and setting up of transmission channels may be effected more efficiently. Furthermore, the high fluctuation of movable network nodes in very dynamic network environments such as communication networks including airborne or landborne vehicles lends itself to lean mechanisms for dynamically re-configuring the network locally.

With the solutions according to the disclosure herein, operators of such ad-hoc networks employing the advanced network management algorithm are able to deliver services to different customers based on an agreed upon level of service as defined in an established business agreement.

According to some embodiments of the method according to the disclosure herein, the node-dependent parameters may comprise present or expected operating states of already existing data transmission connections to ground-based communication networks, network prioritization, data backlog and/or weather data from the environment of the movable network nodes.

According to some further embodiments of the method according to the disclosure herein, the predetermined service performance parameters may be based on one or more parameters in the group of connection setup time, degradation of bit error rate, service recovery time with or without degraded performance, service mean downtime, re-routing stability, packet loss rate, throughput jitter, and throughput maximum delay.

According to some further embodiments of the method according to the disclosure herein, creating the prioritization list may be performed using machine learning.

According to some further embodiments of the method according to the disclosure herein, the service level specifications list may be created, maintained and updated by a central controller in one of the spatially fixed network nodes.

According to some further embodiments of the method according to the disclosure herein, the prioritization list may be maintained and updated by at least some of the movable network nodes.

The above configurations and developments can be combined with one another in any desired manner, if useful. Further possible configurations, developments and implementations of the disclosure herein also comprise not explicitly mentioned combinations of features of the disclosure herein described above or below with respect to the example embodiments. In particular, a person skilled in the art will also in this case add individual aspects as improvements or additions to the respective basic form of the disclosure herein.

BRIEF DESCRIPTION OF THE DRAWINGS

The disclosure herein is explained in more detail below on the basis of the example embodiments indicated in the schematic figures, in which.

Figure 1:
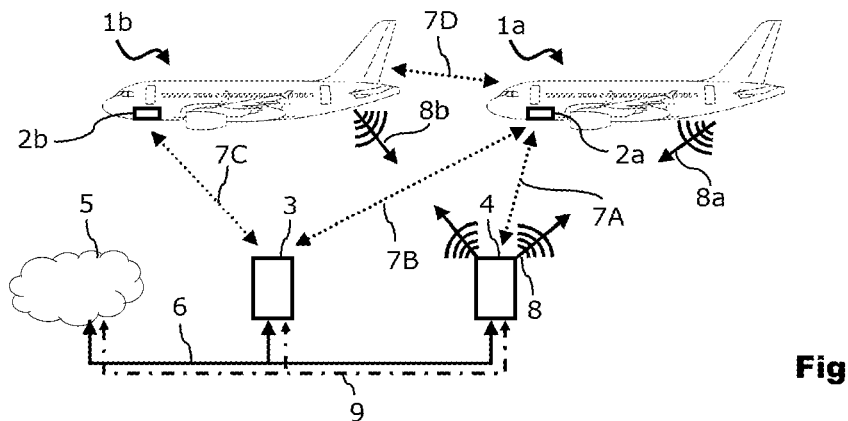
FIG. 1 shows a schematic illustration of an example air-to-ground network topology according to one embodiment of the disclosure herein.

The accompanying figures are intended to convey a further understanding of the embodiments of the disclosure herein. They illustrate embodiments and are used, in conjunction with the description, to explain principles and concepts of the disclosure herein. Other embodiments and many of the advantages mentioned are evident with regard to the drawings. The elements in the drawings are not necessarily shown in a manner true to scale with respect to one another. Direction-indicating terminology, for instance "at the top", "at the bottom", "on the left", "on the right", "above", "below", "horizontal", "vertical", "at the front", "at the rear" and similar statements are used only for explanatory purposes and are not used to restrict the generality to specific configurations as shown in the figures.

In the figures of the drawing, identical, functionally identical and identically acting elements, features and components are each provided with the same reference signs, unless stated otherwise.

DETAILED DESCRIPTION

Directional free-space data transmission is based on data transmission using unguided, directional electromagnetic waves, for example radar waves, microwaves or light. As a special case, free-space optical data transmission ("free space optical communication", FSOC) is based on data transmission using unguided, directional electromagnetic waves in the visible, infrared or ultraviolet frequency range. In this case, the transmitted data signals can be received by a receiver at distances of up to several hundred kilometres. Free-space optical data transmission is similar to directional radio insofar as similar physical active principles come into effect during the propagation of electromagnetic waves used for directional radio. Data transmission rates of up to 100 Gbit/s can be achieved with FSOC.

In typical optical communication networks having permanently installed, that is to say spatially immovable, network nodes, for instance fibre optic networks or RF backhaul networks, data traffic takes place between precisely defined points within the network. Since these points do not change in relation to one another, the network is completely deterministic, with the result that any data traffic can be reliably forwarded in a predictable and plannable manner at any time. If one of the point-to-point connections is interrupted, there are deterministic solutions for nevertheless forwarding the data traffic to each point of the network while excluding the interrupted connection.

In directional communication networks having a heterogeneous mixture of stationary and mobile network nodes, this determinism partially disappears—in order to be able to reliably maintain directional, and in particular optical, communication connections as directional point-to-point connections at any time, there is a need for advanced solutions which are able to accordingly take into account dynamically changing network configurations in the dynamic connection planning. This is all the more important, the higher the available bandwidth of the point-to-point connections of the network since the potential data losses increase with increasing data rate while the duration of a potential connection failure remains the same.

FIG. 1 shows a schematic illustration of an example air-to-ground network topology in which movable network nodes—illustrated here, by way of example, as aircraft 1*a* and 1*b*—are connected to spatially fixed network nodes-illustrated here, by way of example, as land-based communication towers or ground stations 3 and 4—via directional point-to-point connections. Furthermore, the movable network nodes may also establish directional communication connections between one another.

Each movable network node 1*a* and 1*b* respectively has a flat optical communication terminal having one or more communication terminal devices 2*a* and 2*b*. In the case of aircraft, the respective communication terminal device 2*a* or 2*b* may be mounted on an outer surface of the aircraft, for example on a part of the fuselage underside. The communication terminal device may be designed in such a manner that it substantially does not project from the plane of the outer surface of the aircraft on which it is mounted, thus reducing any additional air resistance which would otherwise be produced by the communication terminal device.

The communication terminal devices 2*a* and 2*b* may be, for example, optical communication terminal devices 2*a* and 2*b* and may be configured in such a manner that they can communicate with one or more ground stations 3 and 4 via a free-space optical communication connection 7A, 7B, 7C. In particular, it is possible to maintain more than one free-space optical communication connection to various stations of the ground stations 3 and 4, thus enabling a transfer method of the movable network nodes 1*a* and 1*b* between various adjacent ground stations 3 and 4. In this manner, all communication networks of the movable network node 1*a* and 1*b* can remain connected to the same ground-based communication network 5, to which the ground stations 3 and 4 are also connected. In particular, the ground-based communication network 5 may be based on fibre optic networks 6, that is to say it may be wired or connected using optical waveguides, in contrast to the wireless free-space optical communication connections 7A, 7B, 7C. The free-space optical communication connections 7A, 7B, 7C may make it possible to interchange data between an aircraft network and the ground-based communication network 6.

In addition to the directional free-space communication connections, it is possible to also maintain omnidirectional, that is to say non-directional, communication connections 8, 8*a*, 8*b*, for example satellite-based or cellular mobile radio connections, for instance an LTE-based "air-to-ground" network (A2G), or radar-based communication connections, for instance Automatic Dependent Surveillance-Broadcast (ADS-B), between the spatially fixed network nodes 3 and 4 and the movable network nodes 1*a* and 1*b*. For this purpose, appropriate communication terminal devices for non-directional communication can be installed both in the spatially fixed network nodes 3 and 4 and in the movable network nodes 1*a* and 1*b* and can be operated in a conventional manner. Accordingly, the backbone network 9 for forwarding the data transmitted via the non-directional communication connections 8, 8*a*, 8*b* between the ground-based communication network 5 and the respective ground stations 3 and 4 can also be configured in a conventional manner.

Figure 2:
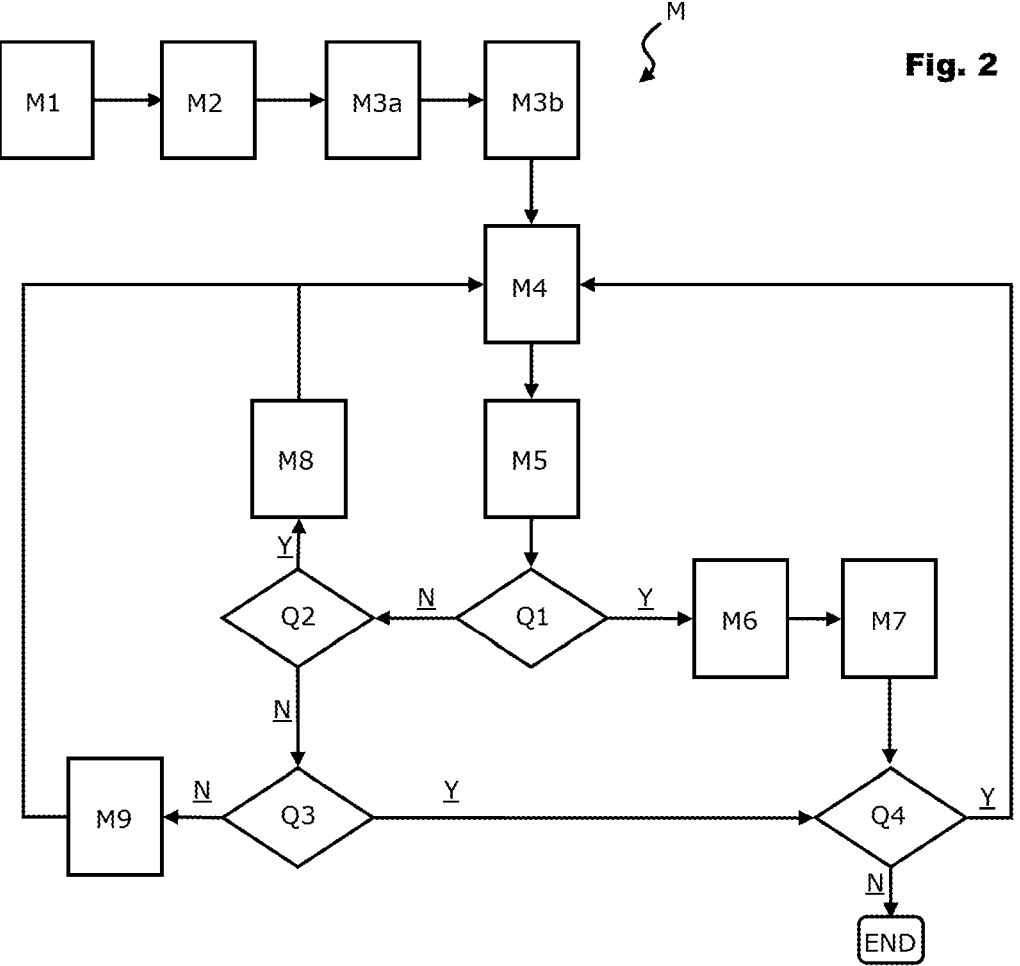
FIG. 2 shows an abstracted flowchart of an example method for establishing a directional free-space data transmission channel between movable and/or spatially fixed network nodes according to a further embodiment of the disclosure herein.

FIG. 2 shows an abstracted flowchart of an example method M for establishing a directional free-space data transmission channel between movable or spatially fixed network nodes, for example a directional, in particular optical, free-space communication connection 7A, 7B, 7C between one of the movable network nodes 1*a* and 1*b* and one of the spatially fixed network nodes 3 and 4, as illustrated and explained in connection with FIG. 1. The method M can be used as a basis for a node-centred set-up model of a directional, in particular optical, free-space communication network, in particular for setting up a high-bandwidth communication network in air-to-ground mobile communication between ground stations and aircraft, spacecraft and/or satellites. The text below refers to the practice of establishing free-space optical communication transmission channels for the example illustration of the method M, but any type of directional free-space communication connections, for instance based on radar waves or microwaves, is likewise possible.

Service level agreements (SLAs) are formal contracts between a service provider, i.e. an operator or a directional network such as the one shown and explained in conjunction with FIG. 1, and a number of subscribers that contains detailed technical specifications called service level specifications (SLSs). Such SLSs are sets of parameters with variable values that define the service offered to a traffic stream in a network.

With the method M, directed links based on the metric of network level priorities may be hierarchically listed according to the measured and/or expected link quality. A basic link quality determination algorithm may be refined using machine learning capabilities under boundary conditions set by either a human operator or by other elements of the network. The link quality may determine adherence to requirements of SLAs as desired by customers of network operators.

In a first step M1, information relating to positions, movement data and calculated or predicted trajectories of all or at least some movable network nodes 1*a*, 1*b* is collected and combined at a central location in a database. This information comprises, in particular, dynamic position information since the local coordinates of the movable network nodes 1*a*, 1*b* always change or can change. Static position information relating to a multiplicity of spatially fixed network nodes 3 and 4 may likewise be collected. The static position information corresponds almost to position information having a speed of movement and acceleration of zero. The information can be collected via a dedicated device in the ground-based communication network 5. This information can be collected, for example, using a sliding window function for a particular period in the past and/or a particular period in the future and can be updated continuously, that is to say at defined intervals of time. The information can be collected, for example, using omnidirectional, that is to say non-directional, communication connections 8*a*, 8*b*, via which the ground-based communication network 5 is already connected to the movable network nodes 1*a*, 1*b* anyway.

The database containing dynamic position data relating to the movable network nodes 1*a*, 1*b* is used as a basis for the calculation or determination of specific and node-dependent parameters or performance features, which are relevant to setting up and maintaining directional point-to-point connections, as carried out in step M2. Examples of the node-dependent parameters or performance features are a predicted duration of the proximity to various ground stations, the current or expected operating state of already existing data transmission connections to ground-based communication networks (availability, reliability, latency, number, QoS, bandwidth, frequency range etc.), network prioritization, data backlog, weather data from the environment of the movable network nodes 1a, 1b or similar node properties relevant to communication.

In step M3a, a service level specifications list of a plurality of service level agreements is created. These service level agreements indicate transmission links to be set up between two or more of the movable or spatially fixed network nodes 1a, 1b or 3, 4. The service level agreements explicitly specify predetermined service performance parameters, such as for example acceptable and/or minimum requirements for connection setup time, degradation of bit error rate, service recovery time with or without degraded performance, service mean downtime, re-routing stability, packet loss rate, throughput jitter, and throughput maximum delay.

In step M3b, a prioritization list of the plurality of service level agreements is created on the basis of the service level specifications list. This prioritization list may sort the required service level agreements according to the urgency of the network connection to a ground-based communication network 5, for example. Of course, other sorting criteria such as customer valuation or criticality of data throughput may be employed additionally or alternatively.

In step M4, one of the service level agreements in the prioritization list to be fulfilled is selected as the first step of a process loop which possibly needs to be run through several times depending on the number of service level agreements. In particular, the service level agreement currently having the highest priority in the prioritization list may be selected. It may also be possible to select one of the service level agreements in the prioritization list according to other selection criteria, such as waiting time to be serviced or similar.

In a subsequent step M5, it may be checked which of a selection of movable or spatially fixed network nodes 1a, 1b and/or 3, 4 are available for setting up a directional free-space data transmission channel 7A, 7B, 7C between the two or more of the movable or spatially fixed network nodes 1a, 1b and 3, 4, respectively. The selection of movable or spatially fixed network nodes 1a, 1b and/or 3, 4 needs to take into account if the predetermined service performance parameters defined by the selected service level agreement can be met with the selection of network nodes. For that purpose, the node-dependent parameters or performance features may be taken into account.

In a step M6, a directional free-space data transmission channel 7A, 7B, 7C may then be established between the two or more of the movable or spatially fixed network nodes 1a, 1b and 3, 4, respectively.

In a decision-making or branching step Q1, a check is carried out in order to determine whether one of the movable or spatially fixed network nodes 1a, 1b, 3, 4 which are possible after the check in step M5 has current free capacities for setting up a free-space optical data transmission channel. If this is the case, a connection request is transmitted in step M6 from the selection of free network nodes to the target network node, for example via omnidirectional, that is to say non-directional, communication connections 8, 8a, 8b, via which the selected free network nodes are connected to the relevant target network node.

If the connection set-up was successful, that is to say if the selection of free network nodes has been successfully used to fulfil the particular selected service level agreement, the service level agreement which is now serviced to the ground-based communication network 5 via a free-space optical data transmission channel can be removed from the prioritization list in step M7.

In a further branching step Q4, a check is then carried out in order to determine whether yet further service level agreements need to be serviced. If this is the case, the process loop can be run through again starting with step M4 for setting up further free-space optical data transmission channels with other free network nodes or ground stations. Alternatively, the method M is aborted after the branching step Q4 (or alternatively run through again from step M4 with the next-ranking service level agreement in the prioritization list).

However, if it is determined in the branching step Q1 that none of the network nodes 1a, 1b, 3, 4 possible after the check in step M5 has current free capacities for setting up further free-space optical data transmission channels or that no network node 1a, 1b, 3, 4 at all is possible, a check is carried out in a branching step Q2 in order to determine whether yet further network nodes are actually free. If this is the case, the process loop starting with step M4 is run through again with the next-ranking service level agreement in the prioritization list.

However, if no further network nodes are free at all, a check is carried out in order to determine whether there is fundamentally a data connection between the ground-based communication network 5 and one of the movable network nodes 1a, 1b. If this is the case, the method M can be aborted via the branching step Q4.

However, if no network nodes are currently available and there is also no data connection between the ground-based communication network 5 and one of the movable network nodes 1a, 1b, it is necessary to provide the corresponding resources for establishing such a data connection. For this purpose, in step M9—in a similar manner to step M5-a selection of the network nodes 1a, 1b, 3, 4 possible for setting up a free-space optical data transmission channel is determined for the service level agreement currently having the highest priority. One of the free-space optical data transmission connections which exist for the selected network node is capped in step M9 in order to provide corresponding capacities for setting up a free-space optical data transmission connection to the currently selected movable network node 1a, 1b so that service level agreement can be actually serviced to the ground-based communication network 5.

In the detailed description above, various features have been combined in one or more examples for the purpose of improving the rigorousness of the description. However, it should be clear in this case that the above description is only of an illustrative nature but is in no way of a restrictive nature. It is used to cover all alternatives, modifications and equivalents of the various features and example embodiments. Many other examples will be immediately and directly clear to a person skilled in the art on the basis of his technical knowledge in view of the above description.

The example embodiments were selected and described in order to be able to illustrate the principles underlying the disclosure herein and their possible uses in practice in the best possible manner. As a result, experts can optimally modify and use the disclosure herein and its various example embodiments with respect to the intended use. In the claims and the description, the terms "containing" and "having" are used as neutral linguistic concepts for the corresponding term "comprising".

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for establishing a directional free-space data transmission channel between movable or spatially fixed network nodes, the method comprising:

collecting dynamic position information relating to a multiplicity of movable network nodes and static position information relating to a multiplicity of spatially fixed network nodes;

calculating specific and node-dependent parameters for each of the movable or spatially fixed network nodes, which are relevant to setting up and maintaining directional point-to-point connections, on a basis of the collected dynamic and static position information;

creating a service level specifications list of a plurality of service level agreements indicating transmission links to be set up between two or more of the movable or spatially fixed network nodes with predetermined service performance parameters;

creating a prioritization list of the plurality of service level agreements on a basis of the service level specifications list;

checking which of a selection of movable or spatially fixed network nodes are available for setting up a directional free-space data transmission channel between the two or more of the movable or spatially fixed network nodes with the predetermined service performance parameters defined by the service level agreement having the highest priority in the created prioritization list; and setting up a directional free-space data transmission channel between the two or more of the movable or spatially fixed network nodes using the selection of movable or spatially fixed network nodes.

2. The method according to claim 1, wherein the node-dependent parameters comprise present or expected operating states of already existing data transmission connections to ground-based communication networks, network prioritization, data backlog and/or weather data from an environment of the movable network nodes.

3. The method according to claim 1, wherein the predetermined service performance parameters are based on at least one of connection setup time, degradation of bit error rate, service recovery time with or without degraded performance, service mean downtime, re-routing stability, packet loss rate, throughput jitter, and throughput maximum delay.

4. The method according to claim 1, wherein creating the prioritization list is performed using machine learning.

5. The method according to claim 1, wherein the service level specifications list is created, maintained and updated by a central controller in one of the spatially fixed network nodes.

6. The method according to claim 1, wherein the prioritization list is maintained and updated by at least some of the movable network nodes.

* * * * *